United States Patent
Jones et al.

(10) Patent No.: US 8,374,619 B2
(45) Date of Patent: Feb. 12, 2013

(54) APPARATUS, COMMUNICATION SYSTEM AND METHODS FOR ENABLING SPECTRUM ACCESS

(75) Inventors: Alan Edward Jones, Wiltshire (GB);
Peter Bruce Darwood, Bristol (GB);
Paul Howard, Bristol (GB)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 12/822,814

(22) Filed: Jun. 24, 2010

(65) Prior Publication Data
US 2010/0278084 A1    Nov. 4, 2010

Related U.S. Application Data

(60) Division of application No. 11/788,491, filed on Apr. 20, 2007, now Pat. No. 8,280,385, which is a continuation-in-part of application No. 11/398,255, filed on Apr. 4, 2006, now abandoned.

(51) Int. Cl.
*H04W 72/00* (2009.01)

(52) U.S. Cl. ..... 455/450; 455/427; 455/448; 455/552.1; 455/436; 370/329; 370/310; 370/312; 370/466; 370/478; 375/149; 375/344; 375/367

(58) Field of Classification Search ........... 455/423, 455/427, 448, 450, 436; 370/329, 310, 312; 375/149, 344, 367
See application file for complete search history.

(56) References Cited

U.S. PATENT DOCUMENTS

| | | | |
|---|---|---|---|
| 5,732,076 A | 3/1998 | Ketseoglou et al. | |
| 5,907,812 A | 5/1999 | Van De Berg | |
| 5,960,329 A | 9/1999 | Ganesh et al. | |
| 6,130,886 A | 10/2000 | Ketseoglou et al. | |
| 6,256,477 B1 | 7/2001 | Eidson et al. | |
| 6,397,068 B1 | 5/2002 | Ganesh | |
| 6,407,993 B1 * | 6/2002 | Moulsley | 370/347 |
| 6,470,184 B1 | 10/2002 | Machida | |
| 6,609,010 B1 | 8/2003 | Dolle et al. | |
| 6,643,522 B1 * | 11/2003 | Young | 455/552.1 |
| 6,859,655 B2 * | 2/2005 | Struhsaker | 455/450 |
| 7,313,126 B2 | 12/2007 | Yun et al. | |
| 2002/0098821 A1 | 7/2002 | Struhsaker | |
| 2002/0105935 A1 | 8/2002 | Miya | |
| 2003/0162553 A1 | 8/2003 | Huang et al. | |
| 2004/0252659 A1 | 12/2004 | Yun et al. | |
| 2005/0025093 A1 | 2/2005 | Yun et al. | |
| 2005/0226175 A1 | 10/2005 | Gupta et al. | |

(Continued)

FOREIGN PATENT DOCUMENTS

| | | |
|---|---|---|
| EP | 1 443 794 A2 | 8/2004 |
| EP | 1 494 490 A1 | 1/2005 |

(Continued)

OTHER PUBLICATIONS

Chinese Notification of First Office Action Dated Mar. 1, 2010 from Chinese Application No. 200780018284.5, 7 pages.

(Continued)

*Primary Examiner* — Manpreet Matharu

(57) ABSTRACT

Embodiments of the invention provide for allocating spectrum in a wireless communication system that supports simultaneously at least a first mode of operation and a second mode of operation. Logic is arranged for determining a proportion of spectrum required for the wireless communication unit to operate simultaneously in both the first mode of operation and the second mode of operation. Logic for allocating spectrum allocates a temporary guard band between a first portion of spectrum for the first mode of operation and a second portion of spectrum for the second mode of operation for use while the wireless communication unit operates simultaneously in the first mode of operation and second mode of operation.

30 Claims, 11 Drawing Sheets

U.S. PATENT DOCUMENTS

2006/0126558 A1     6/2006    Lee et al.
2007/0025290 A1*    2/2007    Afrashteh et al. ............ 370/330

FOREIGN PATENT DOCUMENTS

| | | | |
|---|---|---|---|
| EP | 1494490 A1 * | 1/2005 | |
| EP | 1494490 A1 | 5/2005 | |
| EP | 1 732 339 Al | 12/2006 | |
| EP | 1732339 A1 | 12/2006 | |
| GB | 2 398 455 A | 8/2004 | |
| GB | 2398455 A * | 8/2004 | |
| GB | 2 422 515 A | 7/2006 | |
| GB | 2422515 A | 7/2006 | |
| WO | WO 99/12371 | 3/1999 | |
| WO | WO 2005/004516 | 1/2005 | |

OTHER PUBLICATIONS

Extended European Search Report from EP Application No. 09164199.3—2412/2106172 Dated Aug. 18, 2010, 7 pages.
Extended European Search Report from EP 09164201.7-2412/2106173 Dated Aug. 18, 2010, 7 pages.
Notice Requesting Submission of Opinion from Korean Patent Application No. 10-2008-7027051 dated Jul. 29, 2010, 4 pages.
Communication Pursuant to Article 94(3)EPC from European Patent Application No. 07 717 675.8-2412 Dated Aug. 17, 2010, 5 pages.
International Preliminary Report on Patentability from PCT/EP2007/053316 dated May 14, 2008, 7 pages.
International Search Report and Written Opinion from PCT/EP2007/053316 dated Aug. 28, 2007, 11 pages.
Chinese Third Office Action Dated Jun. 22, 2011; Chinese Patent Application No. 200780018284.5 (with translation).
Japanese Office Action Dated Jun. 28, 2011; Japanese Patent Application No. 2009-503585 (with translation).
Hirokawa, Hiroshi; Japanese Office Action and Translation; Japanese Patent Office; May 2, 2012; 4 pages.
Cabarrus, Aguilar; European Search Report; EP 09 16 4199; Aug. 11, 2010; Munich, Germany; 2 pages.
Cabarrus, Aguilar; European Search Report; EP 09 16 4201; Aug. 11, 2010; Munich, Germany; 2 pages.

* cited by examiner

FIG. 5
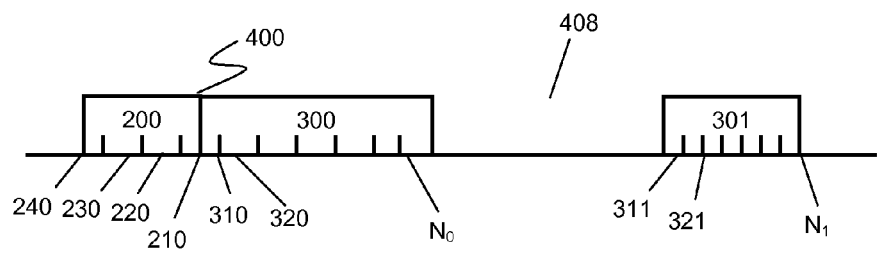
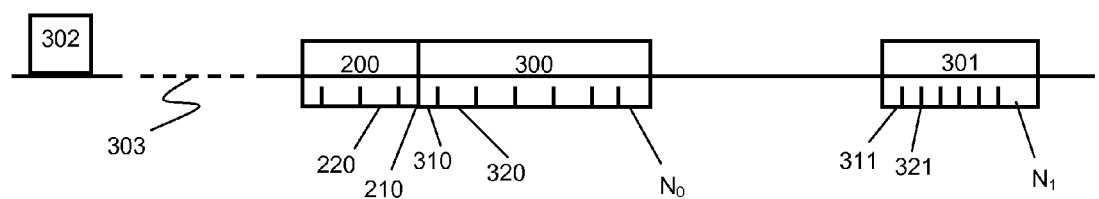
FIG. 6
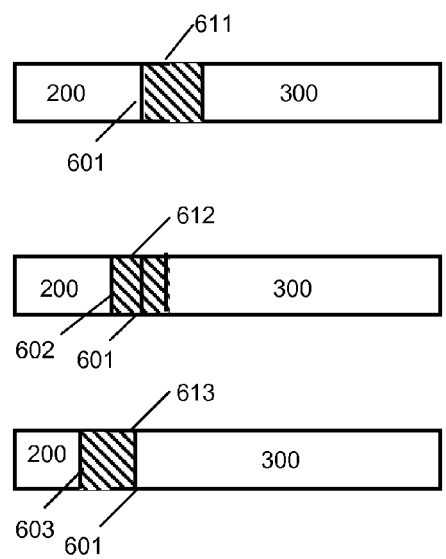

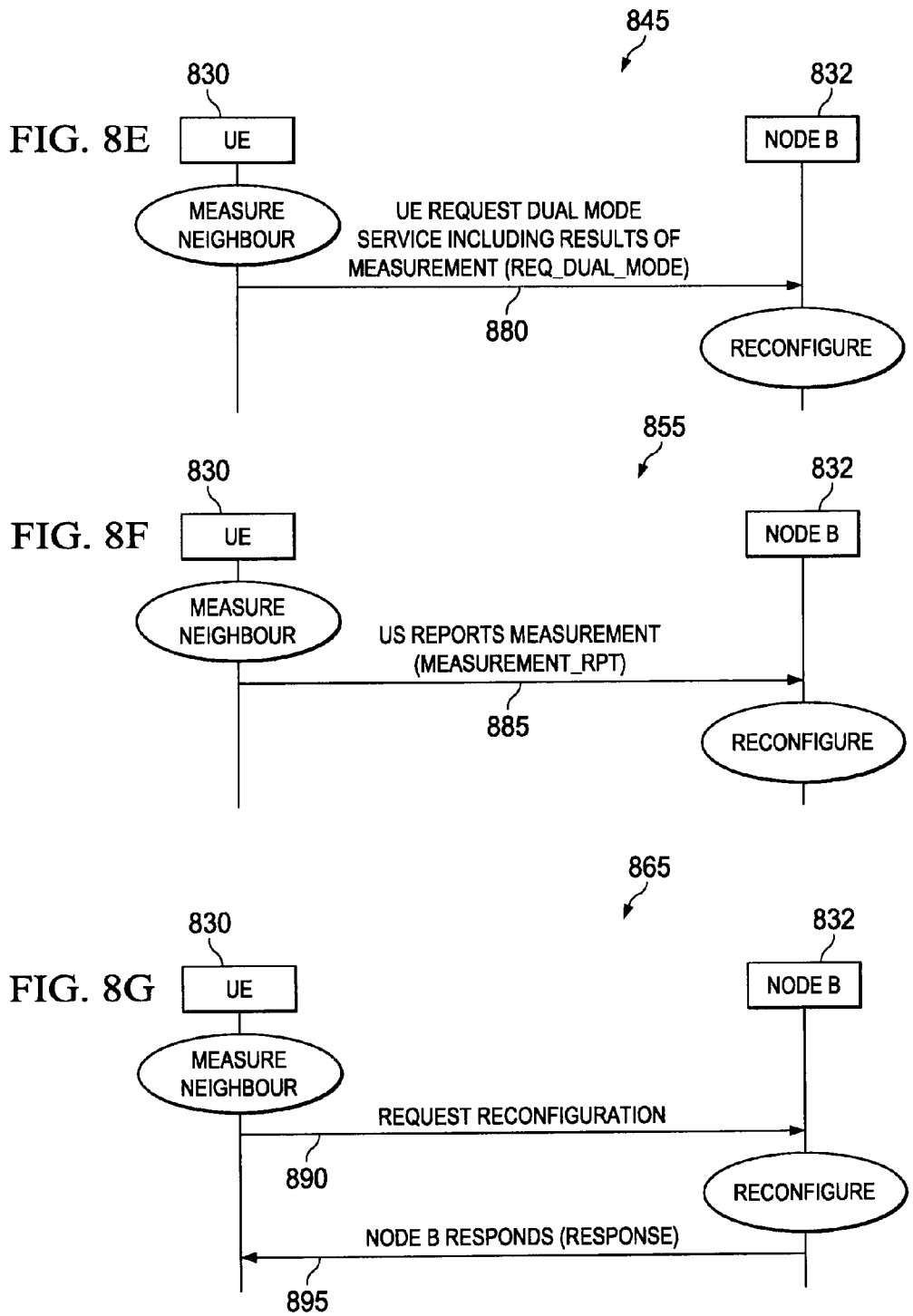

APPARATUS, COMMUNICATION SYSTEM AND METHODS FOR ENABLING SPECTRUM ACCESS

CROSS-REFERENCE TO RELATED APPLICATION

This application is a divisional of U.S. patent application Ser. No. 11/788,491, filed Apr. 20, 2007, which is a continuation-in-part of pending U.S. patent application Ser. No. 11/398,255, filed Apr. 4, 2006, which is incorporated in its entirety herein by reference.

FIELD OF THE INVENTION

The field of the invention relates generally to communication systems and more particularly to allocation of spectral guard bands between at least two communication systems or two modes of communication in such communication systems.

BACKGROUND

In the field of this invention it is known that radio resource is both scarce and expensive. Hence, in designing and operating cellular-based systems, spectrum efficiency must be optimised. This is critical, particularly in the current wireless communication climate, where several Operators compete for customers within the same frequency band.

Typically, frequency spectrum for specific countries is allocated by the respective Government Radio Agency. Sometimes, for example with cellular radio communication systems, the same spectrum is allocated across a number of countries, thereby allowing a single wireless communication device to roam across these countries without needing to provide for dual-mode or multi-mode frequency operation within the user's wireless subscriber communication unit specific to a particular country.

When spectrum is allocated by the Radio Agency, it may be allocated as a whole spectrum block to a particular type of communication system, or alternatively (or in addition) in frequency sub-blocks of spectrum, for example where sub-blocks of spectrum are allocated to respective network Operators. Thus, one sub-block of spectrum is often arranged to neighbour another sub-block of spectrum.

In addition, it is also known that communication systems can employ different operational modes, for example modes that carry signals of a different signal type, to be allocated adjacent sub-blocks of spectrum. Thus, in some circumstances, a signal of a first type at one end of a sub-block of spectrum may interfere with a signal of a second (different) type of a neighbouring sub-block of spectrum. For example, the different signal time may be transmitted with a much higher power. If the higher power signal spills over into the adjacent band, across the boundary between adjacent sub-blocks, reception of signals within the band may be hampered.

In current communication systems, a number of known spectrum allocation techniques exist.

One known spectrum allocation technique, is to allocate a fixed amount of spectrum in a particular communication system to each Operator, or a certain number of frequency 'blocks' of spectrum, from a total spectrum allocation for a particular technology, dependent upon the Operator's needs. In this scenario, the Operators are committed to fulfil certain objectives in terms of the amount of traffic they service and the coverage area they support. If the Operators do not fulfil these objectives, part of their spectrum may be re-allocated to, other Operators in need of such spectrum.

However, this approach has the disadvantage that the assessment of whether the objectives are met, and fixedly re-allocating spectrum if they are not met, takes weeks if not months to implement. Furthermore, the technique is generally accepted as too inflexible to meet its desired purpose. Notwithstanding these factors, it is also clearly unsuitable if the spectrum usage for particular Operators occurs in peaks and troughs. A more dynamic way of reallocating spectrum according to traffic needs is therefore required.

An alternative technique has been proposed in U.S. Pat. No. 5,907,812 that focuses on allocation of unused spectrum. U.S. Pat. No. 5,907,812 attempts to optimise spectrum utilisation by providing for flexible coexistence of several radio systems on a common radio frequency band. This involves searching for frequencies that satisfy the interference requirements (in terms of influences from neighbouring Operator frequencies) and the service requirements (in terms of bandwidths required) of the communication system.

This scheme is similar to a 'Dynamic Carrier (Spectrum) Assignment (Allocation)' between co-existent and collaborative Operators. In such a scheme, all frequencies are 'pooled' and are made available to all Operators, provided they comply with designated allocation criteria. U.S. Pat. No. 5,907,812 fails to provide any algorithms or indication on how to implement this scheme.

A wireless communication system usually includes both user wireless communication units and network elements. Such wireless communication systems include GSM, $3^{rd}$ Generation Partnership Program (3GPP), and IEEE 802.11 systems, and the like. A wireless communication unit, such as User Equipment (UE) in a 3GPP system, wirelessly communicates with one or more network elements, such as a Node B in a 3GPP system. Such wireless communication systems may include one or more UEs and/or one or more Node Bs.

Herein, a wireless subscriber communication unit, mobile phone, cellular unit, cell phone, terminal and the like associated with such a wireless system may be referred to as User Equipment or a UE. UEs are typically but not necessarily mobile units having battery supplied power. Alternatively, a UE may be a fixed device obtaining power from a power grid. A UE may include memory, a processor and program code executable on the processor. The memory and/or the processor and/or the program code may be combined into a silicon structure. For example, a processor may include a dedicated processor, a form of built-in random access memory (RAM) and program code saved in a form of read only memory (ROM).

Similarly, herein, network elements such as a Node B, base station (BS), base transceiver station (BTS), base station system/subsystem (BSS), or the like may be referred to as a Node B. Network elements may also include elements such as a base station controller (BSC), mobile switching centre (MSC), and the like.

FIG. 1 and FIG. 2 illustrate a UE located in overlapping coverage areas supported by one or two Node Bs. As shown in FIG. 1, a Node B 100 may provide two distinct communication mode signals 110, 120 having overlapping footprints. Alternatively, two Node Bs may be co-located, where each Node B provides their respective distinct communication mode signal having overlapping footprints, thereby providing an equivalent overlapping coverage area.

Alternatively, as shown in FIG. 2, two Node Bs 100 and 105 may be geographically separated. In this context, however, the pair of Node Bs provide respective mode signals (110, 120), similarly resulting in an overlapping coverage area 140.

At times, a UE 130 may be positioned as shown in the overlapping coverage area 140. The one or more Node Bs 100, 105 resulting in an overlapping footprint may support multiple modes of operation. For example, a first mode of operation may be a Time Division Duplex-Code Division Multiple Access (TDD-CDMA) mode and a second mode of operation may be a Frequency Division Duplex-CDMA (FDD-CDMA) mode.

Alternatively, a first mode of operation may operate in an FDD-CDMA mode and a second mode of operation may operate in a TDD-CDMA mode. Alternatively, a first mode of operation may operate in a frequency division multiple access (FDMA) mode and a second mode of operation may operate in a TDD-CDMA mode. Those skilled in the art will realize that other mode combinations are also possible. Signalling provided in one mode of operation may allow for a service that another mode or other modes may not support. For example, a system operating using a frequency division duplex (FDD) code division multiple access (CDMA) FDD-CDMA mode may provide for efficient use of resources for point-to-point data traffic, whereas a system operating using a time division multiple access (TDD) TDD-CDMA mode may provide for more efficient use of resources for point-to-multi-point broadcast services.

It is known that communication systems operating with separate communication modes may share an overlapping spectrum allocation. Alternatively, communication systems operating with two different modes may have non-overlapping spectrums, which may be separated by a large band used for other communications. Alternatively, it is known that the operational modes may be allocated spectrum separated by a small fixed guard band to help reduce intersystem interference. Alternatively, it is known that such operational modes may share a common spectral boundary.

The spectrum allocation for 3GPP TDD and FDD technologies in ITU Region 1 is described below. The TDD allocation is in a lower portion of the spectrum allocation and is allocated 20 MHz of spectrum in the range 1900 MHz to 1920 MHz. The 20 MHz of spectrum is further segmented into four blocks of 5 MHz. This spectrum is generally referred to as 'unpaired' spectrum and the Node-B and UE transmit on the same carrier, but at orthogonal points in time (Time Division Duplex).

In contrast, the FDD uplink is allocated 60 MHz in a range 1920 MHz to 1980 MHz. The 60 MHz of spectrum is further segmented into twelve blocks of 5 MHz. In this regard, a plurality of contiguous spectral blocks is typically allocated to a particular Operator. The FDD uplink spectrum is paired with FDD downlink spectrum and the allocation of the FDD downlink spectrum is set to be exactly 190 MHz offset from the uplink spectrum. This spectrum is generally referred to as paired spectrum and the base station transmits in the FDD downlink allocation and the mobile transmits in the FDD uplink allocation. To more optimally utilize resources, a UE may commence communication in a first mode of operation, such as a TDD mode, and subsequently may access service using the second mode of operation, such as the FDD mode.

TABLE 1

| Spectrum Allocations | Operator A | Operator B |
| --- | --- | --- |
| Unpaired spectrum | 1915 MHz to 1920 MHz | 1900 MHz to 1905 MHz |

TABLE 1-continued

| Spectrum Allocations | Operator A | Operator B |
| --- | --- | --- |
| Paired spectrum Uplink Downlink | 1920 MHz to 1935 MHz 2110 MHz to 2125 MHz | 1960 MHz to 1970 MHz 2150 MHz to 2160 MHz |

Thus, it is known that at present in Europe, an Operator may be allocated both unpaired and paired spectrum; for example, we may have the allocations defined in Table 1.

As shown, Operator A has 5 MHz of unpaired spectrum and 15 MHz of paired spectrum, whereas Operator B has 5 MHz of unpaired spectrum and 10 MHz of paired spectrum. Notably, Operator A may be allocated unpaired TDD spectrum that is immediately adjacent to the uplink paired FDD spectrum.

For mobile TV applications, the streaming video is planned to be broadcast in the unpaired spectrum, with the paired spectrum to be used for conventional uni-cast transmissions. It is noteworthy that all of the unpaired spectrum is used for downlink transmissions and as such is not operated in a conventional TDD mode, i.e. it is being used for broadcast delivery. A key requirement for mobile TV is the support in the wireless communication device to support simultaneous broadcast reception and uni-cast transmission and reception. This involves the radio frequency (RF) portion of the wireless communication device being enabled for the reception of a very lower power signal in the unpaired TDD spectrum, whilst simultaneously transmitting a high power signal in the paired FDD uplink.

Notably, this simultaneous dual mode of operation creates significant problems, particularly when the separation of the unpaired TDD spectrum to the paired FDD uplink is small.

FIG. 3 illustrates a first mode of operation and a second mode of operation within a spectral band. A band 200 allocated to a first mode of operation and a band 300 allocated to a second mode of operation are separated by a common boundary 400. A first communication system allocated to the first band 200 may include one or more distinct communication signals 210, 220. Similarly, a second communication system allocated to the second band 300 may include one or more distinct communication signals 310, 320. Neighbouring signals may, or may not, be separated by an intra-band guard band 215, 315 or an inter-band guard band 404. FIG. 3 also shows a power spectral plot of two active signals 210, 310 having respective centre frequencies 214, 314.

In the example shown in FIG. 3, the first signal 210 has a peak power 216 that is substantially less than a peak power 316 of the second signal 310. Even though the second signal is allocated spectrum only within the second band 300, the second signal 310 is shown as transmitting ("leaking") power into the first spectral band 200 and therefore interfere with the first signal 210, as illustrated in region 406.

To further illustrate this problem, by way of an example, let us refer to FIG. 4. Here, we have used the spectrum allocations for Operator A, where the FDD transmitter 410 in the device is transmitting at, say, +21 dBm. A typical value for receiver sensitivity for a 3GPP TDD receiver would be approximately −103 dBm. We see from FIG. 4, that imperfections in the FDD transmitter create sideband noise (often referred to as adjacent channel splatter), which fall into the transmitter's adjacent channel. A typical value of adjacent channel interference (ACI) is 33 dBc, which in FIG. means that the interference produced by the FDD transmitter may be of the order of −12 dBm.

A typical value of RF isolation between the TDD receiver 420 on the TDD link 425 and FDD transmitter 410 on the FDD uplink 415 in a device may be of the order of 15 dB. Thus, this means the interference from the FDD transmitter, as seen at the TDD receiver may be of the order of −27 dBm. This effectively means that the TDD receiver is substantially de-sensitised 430 when the FDD transmitter 410 is active, i.e. is effectively unable to receive TDD signals when the FDD uplink channel is transmitting. From a system point of view, this means that applications running over the unpaired TDD spectrum in the communication device become unusable when FDD uplink is activated.

FIG. 5 illustrates contiguous and non-contiguous allocated bands. A first band 200 provides for channels 210, 220, 230, 240 for a first mode of operation. Two bands 300, 301 provide for channels (310, 320, . . . , $N_0$ and 311, 321, . . . , $N_1$) for a second mode of operation. For example, band 200 may represent a band operating in a TDD-CDMA mode, and bands 300 and 301 may represent bands used for operating in a FDD-CDMA mode. Uplink and downlink communications may be separated by time and/or frequency channel spacing in the TDD band 200.

In FDD-CDMA operation, band 300 may provide uplink channels and band 301 may provide corresponding downlink channels. As described above, frequency bands may be adjacent or contiguous as shown in FIG. 5 at 400, or alternatively, may be separated by a guard band as shown in FIG. 5 at 408.

As mentioned, one known solution to reduce interference between signals from neighbouring blocks of spectrum is for a permanent guard band to be placed at one end or both ends of a block of spectrum. The permanent guard band spectrally separates signals from possibly interfering signals from other bands.

A need exists to more efficiently allocate spectrum.

BRIEF SUMMARY OF THE INVENTION

Embodiments of the invention provide for an apparatus for allocating spectrum in a wireless communication system that supports simultaneously at least a first mode of operation and a second mode of operation. The apparatus comprises logic for determining a proportion of spectrum required for the wireless communication unit to operate simultaneously in both the first mode of operation and the second mode of operation. In accordance with embodiments of the invention, the apparatus further comprises logic for allocating spectrum in a wireless communication system capable of allocating a temporary guard band between a first portion of spectrum for use with a first mode of operation and a second portion of spectrum for use with a second mode of operation.

In some embodiments, the first mode of operation comprises operation in unpaired spectrum and the second mode of operation comprises operation in paired spectrum. In some embodiments, the first mode of operation comprises downlink only transmissions and the second mode of operation comprises frequency division duplex (FDD) uplink operation. In some embodiments, the first mode of operation comprises broadcast TV downlink transmissions in unpaired downlink spectrum. In this manner, a TDD service may not apply.

In some embodiments, a bandwidth of the allocated temporary guard band is preconfigured based on a mapping of services to one or more frequency carrier(s). In some embodiments the temporary guard band may be configured to be an integer multiple of the unpaired channel bandwidth. In some embodiments, the temporary guard band may comprise a bandwidth that falls at least partially within a first spectrum band supporting the first mode of operation. In some embodiments, the allocated temporary guard band is configured as an integer multiple of the first portion of spectrum. In some embodiments, the temporary guard band comprises a bandwidth that falls at least partially within a second spectrum band supporting in the second mode of operation.

In some embodiments, the apparatus further comprises a transmitter for transmitting a message to the wireless communication unit wherein the message comprises an instruction to the wireless communication unit to limit transmissions within the temporary guard band, for example by reducing transmit power in the FDD uplink.

In some embodiments, the logic for allocating spectrum is capable of re-allocating a portion of the temporary guard band to useful spectrum, for use by at least one further wireless communication unit, after the wireless communication unit has finished operating simultaneously in the first mode of operation and second mode of operation.

In some embodiments, the apparatus comprises a receiver for receiving a first signal from a wireless communication unit wherein the first signal comprises a request for the wireless communication unit to operate simultaneously in both the first mode of operation and the second mode of operation. In this manner, the embodiments of the invention may be applied to two systems independently. In some embodiments the receiver receiving the first signal comprises logic for identifying an implicit request from the wireless communication unit to operate simultaneously in both the first mode of operation and the second mode of operation.

In some embodiments, the receiver receiving the first signal comprises logic for identifying a request for a service from the wireless communication unit. In some embodiments, the request comprises a request to receive a broadcast service.

In some embodiments, the receiver receiving the first signal comprises logic for identifying an explicit request from the wireless communication unit to operate simultaneously in both the first mode of operation and the second mode of operation.

In some embodiments, the apparatus further comprises a transmitter capable of sending to the wireless communication unit a request for an indication from the wireless communication unit of a desired temporary guard band. In some embodiments, the apparatus further comprises logic for receiving such an indication from the wireless communication unit of a desired temporary guard band.

In some embodiments, the wireless communication unit receives at least an encryption parameter to instruct the wireless communication unit to operate in a first portion of spectrum in the first mode of operation and simultaneously in a second portion of spectrum in the second mode of operation.

In some embodiments, a first Operator and a second Operator are allocated shared spectrum on one or both sides of the temporary guard band. In some embodiments, the first Operator utilises spectrum allocated to the second Operator.

In some embodiments, the spectrum allocation from the first Operator and second Operator is aggregated and at least a portion of the aggregated spectrum shared therebetween. In some embodiments, at least a portion of the aggregated spectrum is shared to provide shared content. In some embodiments, the shared content comprises shared TV channels.

In some embodiments, the shared aggregated spectrum comprises unpaired spectrum adjacent to a frequency division duplex (FDD) uplink (UL) allocation.

Other embodiments of the invention provide for a method for enabling spectrum access in a wireless communication system that supports simultaneously at least, a first mode of operation and a second mode of operation. The method comprises determining a proportion of spectrum required for the wireless communication unit to operate simultaneously in both a first mode of operation and a second mode of operation. The method further comprises enabling spectrum access by allocating a temporary guard band, which may be an integer multiple of the unpaired channel bandwidth, between a first portion of spectrum for the wireless communication unit to operate in a first mode of operation and a second portion of spectrum for the wireless communication unit to operate simultaneously in a second mode of operation.

Some embodiments of the invention provide for a wireless communication unit capable of simultaneously communicating in at least a first mode of operation and a second mode of operation. The wireless communication unit comprises a transceiver capable of transmitting and receiving simultaneously in both a first mode of operation in a first portion of spectrum and in a second mode of operation in a second portion of spectrum. Logic is provided for adapting a frequency of operation of the transceiver to accommodate an allocated temporary guard band between the first portion of spectrum and second portion of spectrum.

Some embodiments of the invention provide for a method of transmitting and receiving simultaneously in both a first mode of operation in a first portion of spectrum and in a second mode of operation in a second portion of spectrum. The method further comprises adapting a frequency of operation of transmitting and receiving simultaneously to accommodate an allocated temporary guard band between the first portion of spectrum and second portion of spectrum.

Some embodiments of the invention provide for a communication system capable of supporting simultaneously at least a first mode of operation and a second mode of operation. The communication system comprises logic for determining a proportion of spectrum required for the wireless communication unit to operate simultaneously in both the first mode of operation and the second mode of operation. Logic is also provided for allocating a temporary guard band between a first portion of spectrum for use by the wireless communication unit in a first mode of operation and second portion of spectrum for simultaneous use by the wireless communication unit in the second mode of operation.

In some embodiments, a computer program product comprises executable program code for allocating spectrum in a wireless communication system. The computer program product comprises program code for determining a proportion of spectrum required for the wireless communication unit to operate simultaneously in both the first mode of operation and the second mode of operation. The computer program product further comprises program code for allocating temporary guard band between a first portion of spectrum for use by the wireless communication unit in the first mode of operation and a second portion of spectrum for the wireless communication unit to operate simultaneously in the second mode of operation.

Other features and aspects of the invention will become apparent from the following detailed description, taken in conjunction with the accompanying drawings that illustrate, by way of example, the features in accordance with embodiments of the invention.

The summary is not intended to limit the scope of the invention, which is defined solely by the claims attached hereto.

BRIEF DESCRIPTION OF THE DRAWINGS

FIG. 5 illustrates contiguous and non-contiguous allocated bands.

FIG. 6 illustrates various positions of a guard band within allocated bands in accordance with embodiments of the invention.

FIGS. 8A to 8G illustrate signaling between a UE and a Node B in accordance with embodiments of the invention.

DETAILED DESCRIPTION OF THE INVENTION

Figure 1:
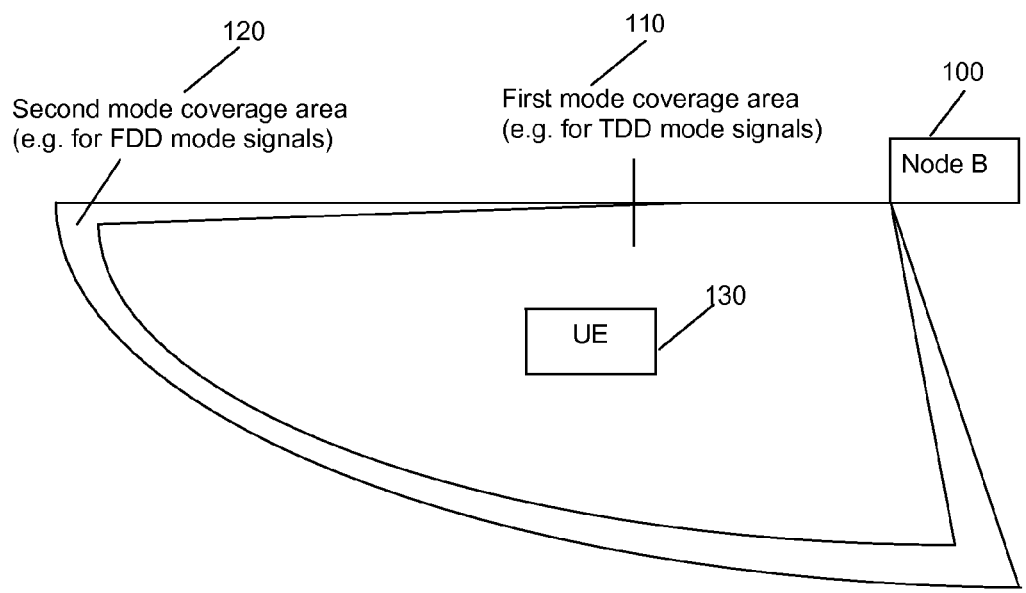
FIGS. 1 and 2 illustrate a UE located in overlapping coverage areas provided by one or two Node Bs.
Figure 2:
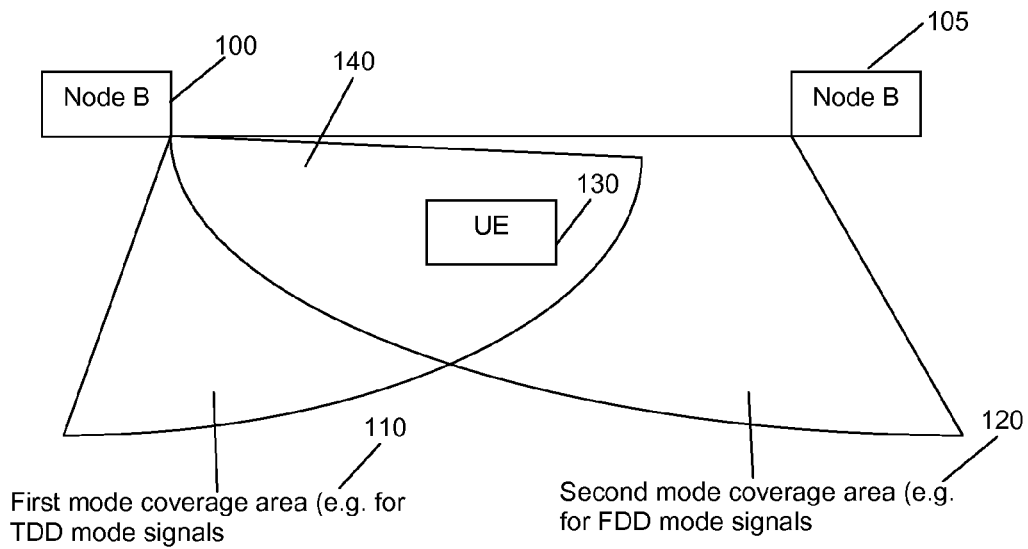
Figure 3:
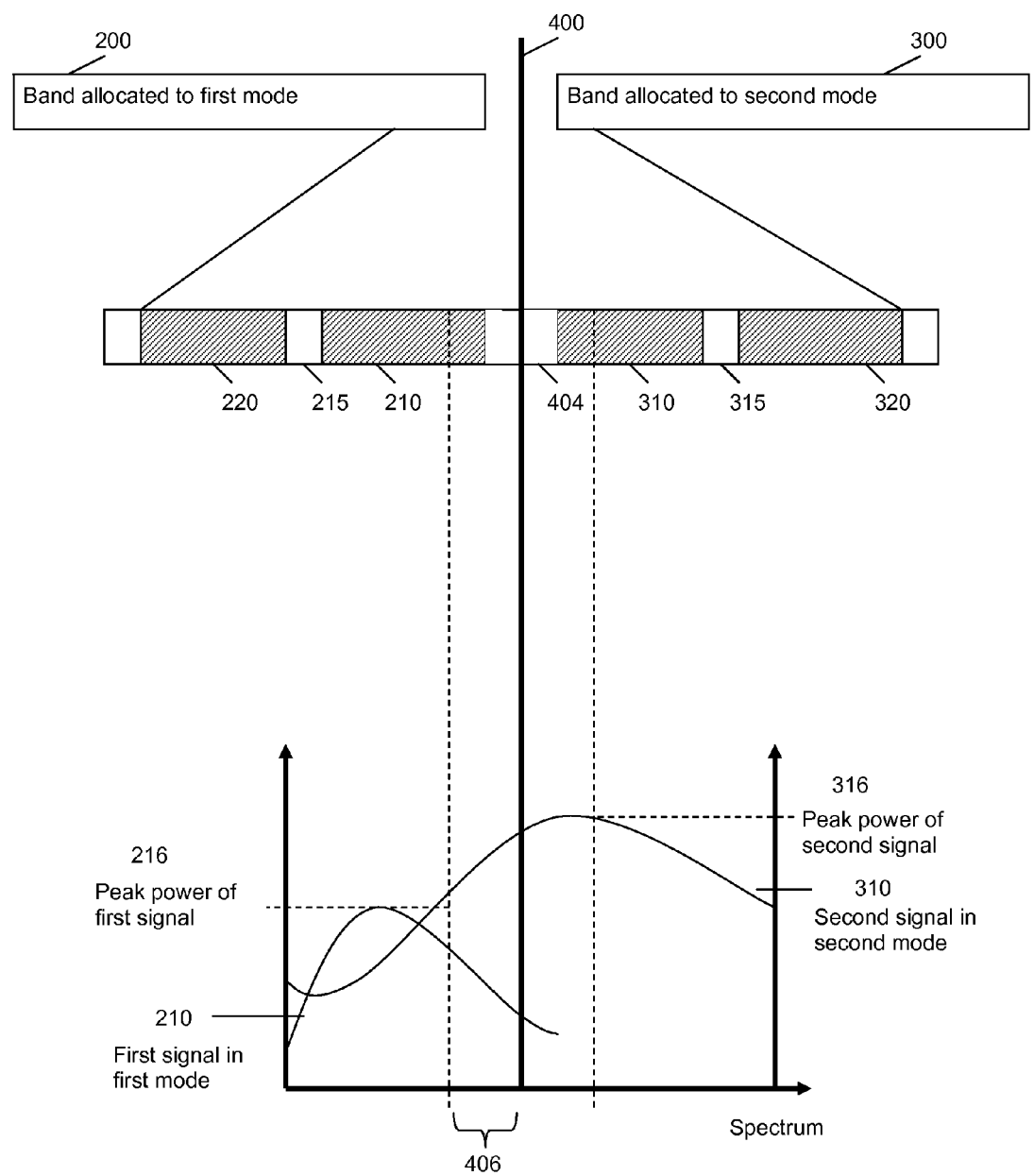
FIG. 3 illustrates first mode and second mode signals within a spectrum.

In the following description, reference is made to the accompanying drawings that illustrate several embodiments of the invention. It is understood that other embodiments may be utilized and mechanical, compositional, structural, electrical, and operational changes may be made without departing from the scope of the invention. The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the scope of the appended claims. The description is not intended to be exhaustive or to limit the invention to the precise form disclosed.

Embodiments of the invention provide for determining whether potential interference between operating modes may exist when two distinct communication operating modes are allocated adjacent (or substantially adjacent), frequency spectra. In response to such a determination, a temporary guard band is allocated to spectrally separate the two communication operating modes, thereby reducing or preventing inter-signal interference.

Some embodiments of the invention provide for a communication system to be integrated with a neighbouring communication system to provide improved central control.

The provision of a temporary guard band may be initiated by User Equipment and/or by a Node-B, in response to determining whether an interfering signal may exist using currently allocated frequencies. Some embodiments of the invention provide for communication systems re-allocating an active user to spectrum away from a band edge.

Some portions of the detailed description that follows are presented in terms of procedures, steps, logic blocks, processing, and other symbolic representations of operations on data bits that can be performed on computer memory. A procedure, computer executed step, logic block, process, etc., may be considered as comprising a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Furthermore, in accordance with some embodiments of the invention, a temporary allocated guard band may, be freed when either the UE, Node-B or other network element determines that no, or minimal, interference of signals may be expected, thereby more optimally using spectrum where the temporary guard band would otherwise exist.

One objective of embodiments of the invention is to enable simultaneous dual mode operation without the de-sensitisation described in the background of the invention.

Enhanced embodiments of the invention further propose a network sharing concept, and in some embodiments of the invention network sharing in a context of broadcast Mobile TV services over unpaired spectrum. Network sharing implies that one common set of infrastructure elements are used to service a plurality of users from more than one Operator.

In summary, in accordance with embodiments of the invention, when the UE requests to operate in a simultaneous dual-mode operation, for example dual TDD and FDD operation, the network may re-configure the FDD Uplink carrier such that a temporary guard band is inserted between the unpaired spectrum and the paired spectrum. In this manner, the temporary guard band may enable simultaneous dual mode operation through the use of conventional filtering means.

One example of conventional filtering means is a Bulk Acoustic Wave (BAW) filter that is commonplace in integrated RF solutions for mobile phone applications. A further example is a Film Bulk Acoustic Resonator (FBAR) filter. These conventional filtering means provide steep roll-off so as to attain the desired stop band rejection enabled through the use of a temporary guard band.

Alternatively, the network may instruct the UE to re-configure the TDD carrier, in contrast to the FDD carrier, such that a temporary guard band is inserted between the unpaired spectrum and the paired spectrum. Moreover, the re-configured unpaired carrier may belong to an Operator that is substantially different to the operator of the paired spectrum.

Thus, in a context of a 3GPP paired (FDD) and unpaired (TDD) spectrum, the network may re-configure the UE's carrier frequencies in the unpaired or paired spectrum bands to ensure a temporary guard band of 10 MHz or greater. Once re-configuration has been confirmed, the network sends to the UE the encryption keys used for decrypting the broadcast services. These keys may be sent to the UE using paired spectrum on the point-to-point communication link. It will be understood that the transferral of the keys, from the network to the UE, is one possible mechanism for indicating to the UE that it may start to receive broadcast services in unpaired spectrum. Such a mechanism is an example of implicit signalling and is equivalent to a START_DUAL_MODE message as described later.

Thereafter, the UE starts receiving broadcast services in unpaired TDD spectrum, whilst simultaneously operating data or voice services in paired FDD spectrum.

When simultaneous dual mode operation has finished, for example when the broadcast services are released, the network is then able to decide whether to reconfigure the UE and remove the temporary guard band, or to keep the UE on the current carrier frequency setting and maintain the temporary guard band. In some embodiments of the invention, this decision is made in response to logic ascertaining a level of system capacity and/or network load.

One example of this embodiment employs a General Packet Radio System (GPRS) paired frequency allocation that is used during dual mode operation, with unpaired spectrum. The GRPS spectrum 302 is located at 900 MHz and the unpaired spectrum 200 is located at 1900 MHz, thus providing a temporary guard band of 1000 MHz 303 rather than 10 MHz. Those skilled in the art will understand that attaining the RF isolation is considerably eased when the frequency separation is large. When the broadcast services are released on the unpaired carrier, the UE is re-configured by the network, to the wideband (W)CDMA paired spectrum, where higher data rate services can be supported, but the temporary guard band is configured as being considerably less.

It will be understood that the temporary guard band may be signalled directly to the UEs, or alternatively indirectly signalled. For the indirect case, the temporary guard band may be implicit and may be obtained by the UE scanning unpaired carriers to determine which carrier is providing the required service. Under this scenario this decision in terms of allocating spectrum would be taken at the point in the network where the services are mapped to specific unpaired carriers, as will be appreciated by a skilled artisan.

It will be understood by those skilled in the art that the temporary guard band has a minimum value that needs to be met for correct operation. One example of a minimum value would be 10 MHz. In practice, various sizes of temporary guard band may exist, and these sizes may be greater than or equal to the minimum temporary guard band. This variation in size of temporary guard band is a function of the paired spectrum that has been allocated to a particular Operator. For example, if we consider FIG. 9, Operator B, 956 will have a substantially larger temporary guard band than Operator A, 954.

FIG. 6 show various, spectral positions of a temporarily created guard band between, or partially located within, allocated frequency bands 200, 300 in accordance with embodiments of the invention. At or near a band delineation frequency 601, a signal at one end of an allocated band 300 may interfere with a signal at the adjacent end of another allocated band 200, if either no guard band exists or if a small guard band exists.

In some embodiments of the invention, an estimation may be made as to whether sufficient guard band exists by simply comparing the FDD UL carrier to the unpaired carrier. In this embodiment, if the difference is less than a predefined value then a reconfiguration is required.

In terms of the predefined value, 10 MHz may be used as a minimum for a 5 MHz allocation at 2 GHz. Hence, the concept of the temporary guard band being an integer multiple of the unpaired channel bandwidth is particularly advantageous in this embodiment, e.g. applied to at least twice the unpaired channel bandwidth.

Thus, in accordance with embodiments of the invention, the temporary creation of a guard band is introduced. In one embodiment of the invention, the temporary guard band 611 may reside entirely outside band 200, to the right of band delineation frequency 601 in FIG. 6. Alternatively, the temporarily created guard band 613 may reside entirely outside band 300 to the left of band delineation frequency 601 in FIG. 6. Alternatively, the temporarily created guard band 612 may reside partially inside both frequency band 200 and frequency band 300 in FIG. 6.

Figure 4:
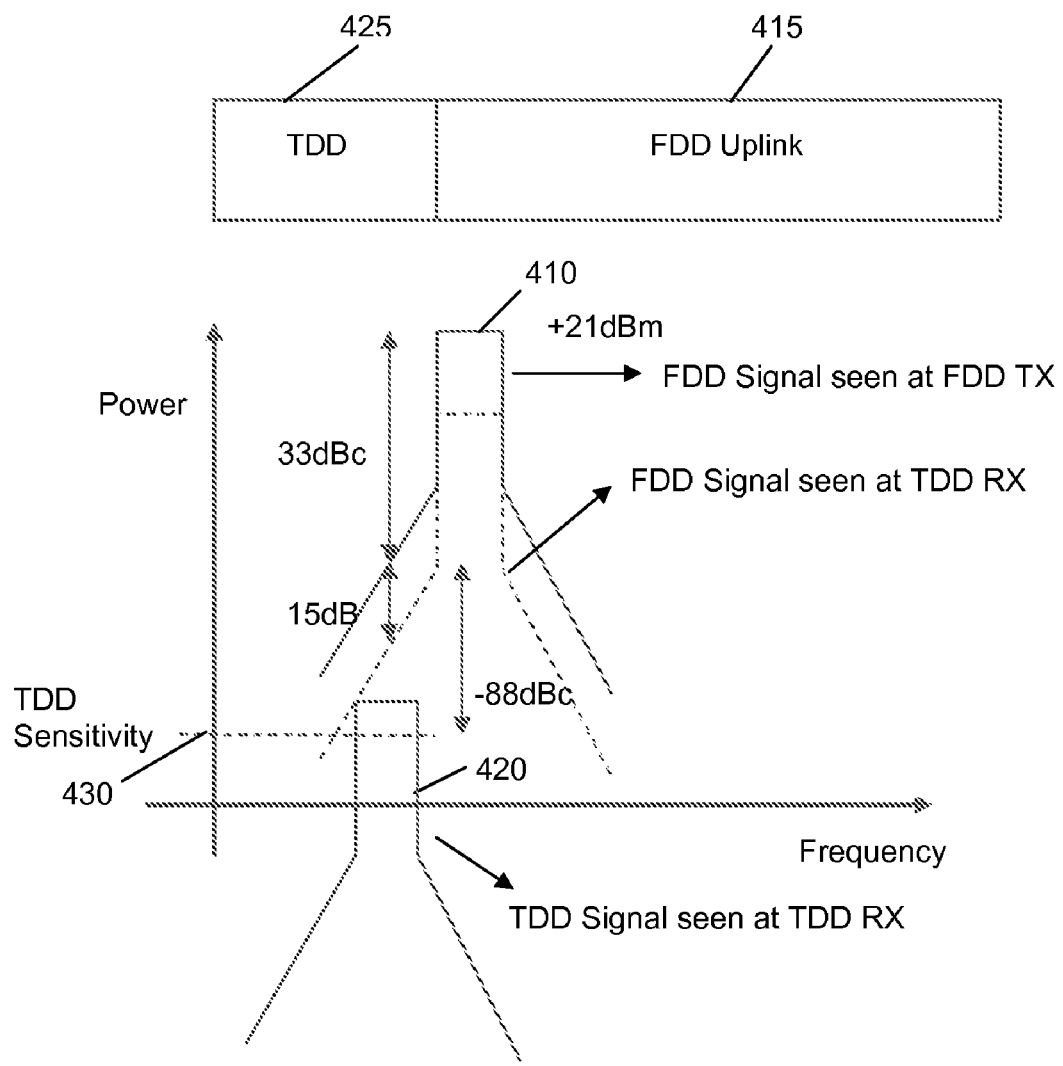
FIG. 4 illustrates an example of how a receiver may be de-sensitised by an adjacent transmitter.
Figure 7:
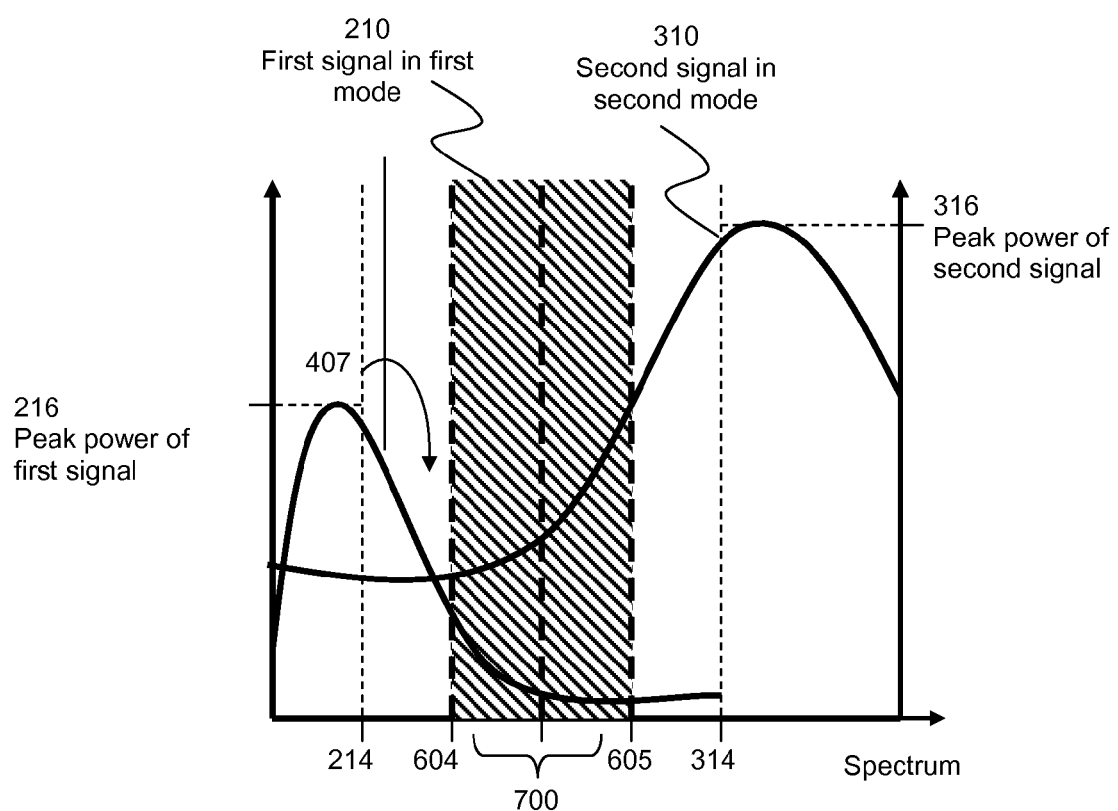
FIG. 7 illustrates first mode and second mode signals separated by a guard band in accordance with embodiments of the invention.
Figure 8A:
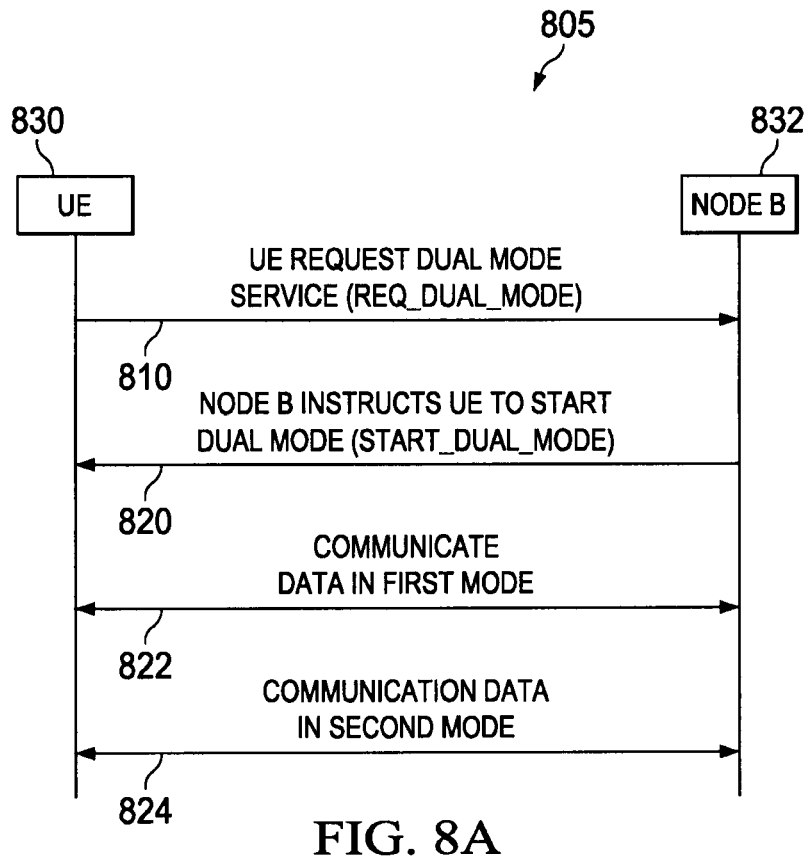
Figure 8B:
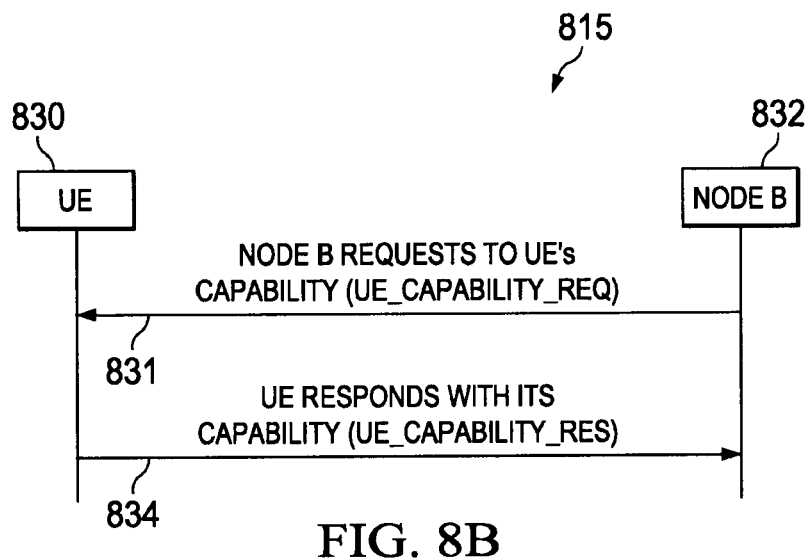
Figure 8C:
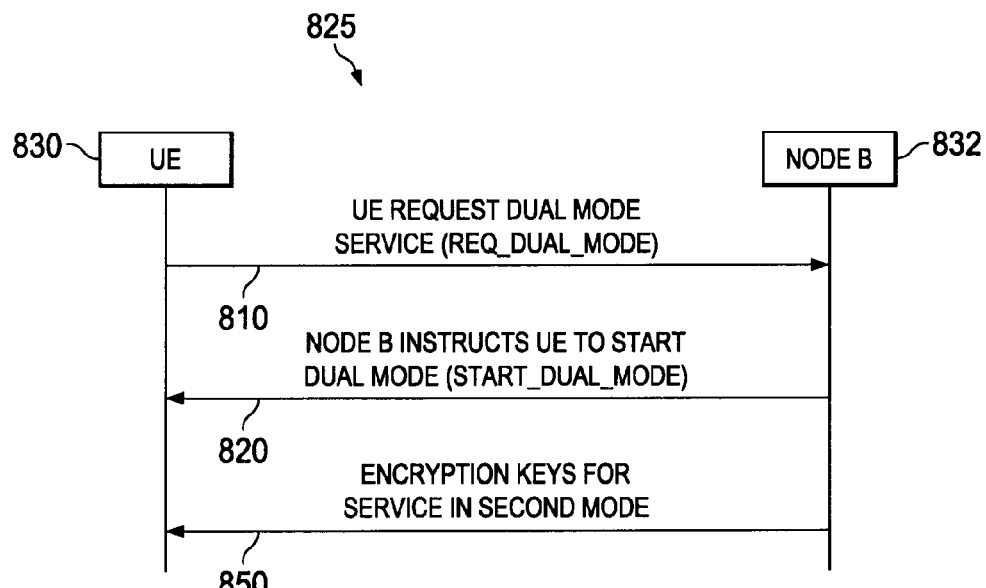
Figure 8D:
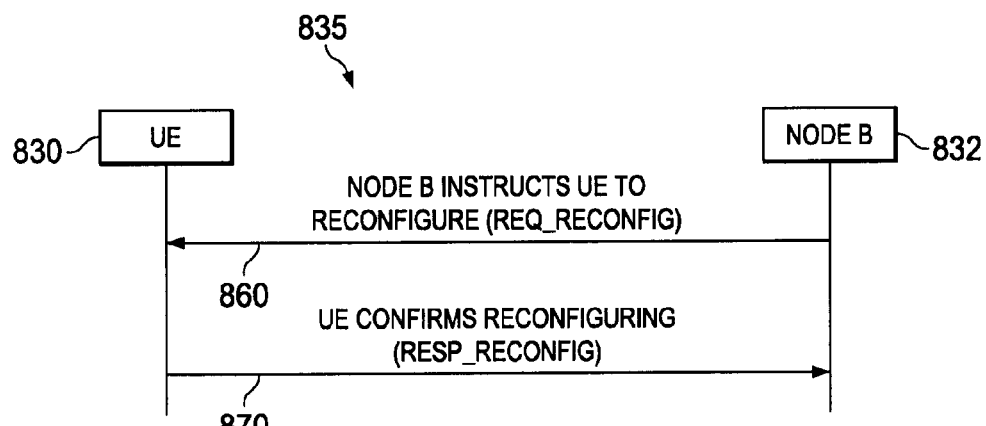

FIG. 7 illustrates a first set of received signals of the UE in a first mode of operation, say a TDD mode of operation, and a second set of concurrently transmitted signals by the UE in a second mode of operation, say a FDD mode of operation, separated by a temporary guard band 700 in accordance with embodiments of the invention. An exemplary representation of the temporary guard band 700, with temporary guard band delineation frequencies 604 and 605 is shown on a single chart. The signals 210 and 310 continue to have relative peak power differences 216, 316 as before. However, as illustrated, the interference between the signals 210, 310 in region 406 (of FIG. 4) has been significantly reduced as shown in region 407.

Referring now to FIGS. 8A to 8G, a series of signal flow diagrams illustrate signalling between a UE 830 and a Node B 832 in accordance with embodiments of the invention. To initiate a request for service, signal flow diagram 805 illustrates the UE 830 sending the Node B 832 a request for dual mode service indication (request dual-mode message) 810. A request-dual-mode message 810 may be an explicit request for dual mode operation. For example, the UE 830 may precisely and clearly express a request for a resource in the second mode of operation, if such a resource is available in the network.

Alternatively, the request-dual-mode message 810 may be an implied request for dual mode operation. For example, in one embodiment of the invention, certain types of services may be carried in unpaired spectrum. In this embodiment, by recognising that a UE 830 is requesting a certain service, for example in a second mode of operation, the network is able to infer that the UE desires dual mode operation.

An example of this embodiment might be a video streaming services or real time mobile TV that is running in unpaired spectrum. Another example might be carousel type services, such as stock quotes. A yet further example of this embodiment, popular with Operators, may be high quality audio services over unpaired spectrum, e.g. Virgin FM.

In one embodiment of the invention, the Node B 832 or other network element(s) may determine that dual mode operation is requested based on a type of request received from the UE 830. For example, the UE may request a service, such as to receive point-to-multipoint broadcast programming, which is offered in the second mode. In some embodiments, the network may determine that the UE 830 has the capability to function in dual mode prior to granting the request.

Alternatively, the Node B 832 and/or any other network element(s) may infer that the UE 830 requests dual mode operation. For example, the Node B 832 or other network element(s) may determine, based on information known by the network about the UE 830, that the UE 830 may use a resource in the second mode of operation, if available.

In either case, the UE 830 may either be currently operating using the first mode of communications, or alternatively, the UE 830 may initiate operation in the second mode by sending a request-dual-mode message 810 in the first mode.

Upon receiving the implicit message or explicit request-dual-mode message 810, the Node B 832 and/or other network element(s) may determine whether or not a sufficient guard band exists. For example, the Node B 832 and/or other network element(s) may estimate an amount of potential interference between data communicated using the first mode and data communicated using the second mode. For example, a UE 830 may be exchanging data with the network using the first mode. Thus, based on the communication characteristics of the communicated data and likely characteristics of communication on the requested second mode of operation, the network may determine that a spectral resource neighbouring the first mode signal may be available. However, the network may also determine that a spectral resource neighbouring the first mode signal may be too close in frequency, thus leading to potential inter-signal interference.

The network (Node-B 832) may need to allocate a temporary guard band of at least 10 MHz as a reasonable separation of unpaired spectrum to paired spectrum in a 3GPP communication system. In this regard, if a sufficient guard band (in excess of 10 MHz) exists, the network 832 would likely not re-configure the spectral allocations to the UE 830.

However, if an insufficient guard band exists, the network creates a temporary guard band. The temporary guard band may be allocated for a small period of time, for example a length of time of either the call on the FDD link or the broadcast transmission on the TDD downlink communication channel. Alternatively, the temporary nature of the guard band, as generated by the network, may be lengthy, for example a length of time that a particular portion of spectrum is allocated to a particular Operator. Also the temporary nature of the guard band may be generated for any length of time between the above two extremes.

The temporary guard band may fall at least partially within a first band operating in the first mode, or may fall at least partially within a second band operating in the second mode, or may fall partially within a first band operating in the first mode and fall partially within a second band operating in the second mode. In addition, creating a temporary guard band may include re-configuring one or more transmitters (UE or Node-B) to limit transmissions within the temporary guard band. After the need for the temporary guard band has passed (e.g., dual mode operation has finished), the network may free the temporary guard band to allow the spectrum to be used to satisfy other requests.

If a resource is currently available for the UE 830 for use in the second mode of operation, the Node B 832 and/or other network element(s) may instruct the UE 830 to start dual mode operation (start-dual-mode message 820).

Alternatively, if a resource can be made available for use in the second mode of operation, the Node B 832 and/or other network element(s) may instruct one or more UEs to re-configure its operation, for example change its carrier frequency, thereby making available the resource for UE 830, as described below with reference to signal flow diagram 845. Once the UE 830 has re-configured its operation to the new carrier frequency, a re-configured confirmation message may be sent from the UE 830 to the network 832 to confirm that the carrier frequency has been changed to the new carrier frequency.

The start-dual-mode message 820 may be an explicit instruction to commence dual-mode operation. Alternatively, the start-dual-mode message 820 may be a message granting a service, thus implying dual mode operation is to commence. For example, the message 820 may be a response to a request for a broadcast service (for example message 810). The message 820 may include information that the UE 830 may use to properly receive and process the requested broadcast service.

Upon receipt of the start-dual-mode message 820, the UE 830 determines, either explicitly or implicitly, that the UE may commence dual mode operation. Alternatively, the network may deny the UE's request explicitly (e.g., by sending the UE 830 a request-denied message (not shown)), or implicitly by not responding to the UE 830 dual-mode-request 810. In the latter case, the UE 830 may time-out and/or may send one or more additional request-dual-mode messages 810. Alternatively, the UE 830 may time-out and may terminate its request for dual mode operation.

A further alternative embodiment establish the guard band as part of a UE scanning operation of unpaired carriers. Thus, when the UE finds a carrier that supports the desired service, the UE then establishes a connection in the paired spectrum to initiate a dual-mode operation.

After receipt of a start-dual-mode message 820, the UE 830 and Node B 832 may continue to communicate data in the first mode of operation, as indicated by message(s) 822. Concurrently, the UE 830 and Node B 832 may begin to communicate, for example receive downlink broadcast transmissions, in the second mode of operation, as indicated by message(s) 824.

Thus, the network sends the start-dual-mode message 820 to the UE 830. From the UE's perspective, data can now be transferred from the network (for example, Node-B 832) to the UE 830 in unpaired spectrum and the UE 830 is able to transmit in paired spectrum without desensitising a receiving TDD receiver in the unpaired spectrum.

Contemporaneous operation between the UE 830 and the network(s), in both first mode operation and second mode operation, allows the UE 830 benefits of a service provided in the first mode and a service provided in the second mode over the same time period.

Signal flow diagram 815 illustrates an exchange of messages used to determine whether or not a UE 830 has one or more general or specific capabilities. In some embodiments, a Node B 832 sends a request to a UE 830 to determine its capabilities (for example UE-capability-request message 832). In response, the UE 830 may reply with information identifying its capabilities (UE-capability-response message 834). In other embodiments, the UE 830 may send capability information in an unsolicited message (not shown).

The solicited pair of messages 831, 834 or the unsolicited message may occur at various points in an exchange of information between a UE 830 and a network. For example, in some embodiments, capability information may be exchanged during an initial UE exchange with the network. In some embodiments, the capability information may be exchanged before, or as part of, a request-dual-mode message 810. In some embodiments, capability information may be exchanged either before, or after, a start-dual-mode message 820.

The capability information may be used by the network, for example, to determine a minimum bandwidth of a temporary, guard band. Some UEs may include an input filter having a shaped cut-off frequency, thus allowing these UEs to have spectral resources allocated more closely together. As another example, capability information may inform a network whether or not a UE is enabled to operate with an encryption algorithm. As a further example, capability information may inform a network to determine whether or not a UE has a concurrent, dual-mode ability.

Signal flow diagram 825 shows an exchange of messages, as in signal flow diagram 805, with the network providing additional information that a UE 830 may use to establish an encrypted link (e.g., encryption keys for service in the second mode). Encryption information may be provided to the UE 830 as part of a start-dual-mode message 820, or alternatively as a separate message 850, as shown.

Signal flow diagram 835 shows an exchange of messages that may be used to reconfigure a UE 830. The UE 830 may be a separate UE from the requesting UE 830 described above. Equally, the UE 830 may be the same UE 830 as described above. For example, the UE 830 may be operating using a resource that the network determines it will reclaim, in order to create the temporary guard band needed for dual mode operation of UE 830. The network may allocate a new resource for use by the UE 830, and then send a message 860 from the Node B 832 to the UE 830 to instruct the UE 830 to free the current resource and use the new resource. In this manner, a previously used resource may be freed such that the network may create a temporary guard band for UE 830 to use. The UE can confirm 870 reconfiguration in a message to the Node B 832.

Signal flow diagrams 845, 855, 865 illustrate signalling following a measurement by a UE 830. After the UE 830 performs a measurement of operational characteristics of a current cell and/or one or more neighbouring cells, the UE 830 may report this measurement information to the network. The UE 830 may report measurement information to a network along with another message, as shown in signal flow diagram 845. Signal flow diagram 845 shows a UE 830 requesting a dual mode service, as described above with reference to message 810. However, in this regard, the request-dual-mode message 880 includes measurement report information. Alternatively, the measurement information may be reported to the network in a dedicated measurement reporting message 885, as shown in signal flow diagram 855.

Alternatively, a UE 830 may use results from one or more measurement(s) to determine that a specific action should be requested. For example, signal flow diagram 865 shows a UE 830 taking measurements of a current cell and/or one or more neighbouring cells. Based on the measurement(s), the UE 830 decides to send a request for reconfiguration (request-reconfiguration message 890) of the UE. For example, if the UE 830 determines that a second signal is interfering with either the UE's first mode signal, or the UE's second mode signal, the UE can request a reconfiguration of UEs and resources to alleviate the interference. Upon receiving the request-reconfiguration message 890 by the Node B 832, the network may determine that a reconfiguration of resources would benefit system performance or the like.

A second aspect of the invention is the UE capability. In this context, the network requests information from the UE, namely a minimum temporary guard band that is required by the UE. If the UE is capable of supporting simultaneous dual mode operation, the UE responds to the network with its determination of a minimum guard band separation. This information is then used by the network as part of the re-configuration procedure. This aspect of the invention allows future UE releases to support smaller guard bands, due to advances, say, in filter and transmitter technology.

A simple message flow demonstrates the above UE capability. The message UE_CAPABILITY_REQ requests from the UE the minimum temporary guard band. The message UE_CAPABILITY_RES, is the response to the request message. The field in the message that contains the temporary guard band is only populated if the UE supports simultaneous dual mode operation. It will be understood that the capability enquiry would happen prior to the message RECONFIG_REQ.

In a further alternative embodiment of the invention, unpaired spectrum may be used for the point-to-point communication link, with broadcast services being sent on a separate carrier that also uses unpaired spectrum. Hence, the re-configuration may be applied to the unpaired spectrum carrying the point-to-point communication link. This scenario may arise when contiguous unpaired spectrum blocks are used by the same Operator.

In a yet further embodiment of the invention, unpaired spectrum may be used for the point-to-point communication link, where paired spectrum is used for other data services, such as multicast services. Hence, the re-configuration may be applied to the unpaired spectrum carrying the point-to-point communication link.

The network may reallocate a UE 830 (as shown in signal flow diagram 835) or may reallocate the UE 830 as shown by a response message from the Node B 832, for example response message 895.

In an alternative or an enhanced embodiment of the invention, in order to more efficiently allocate spectrum, and in the enhanced embodiment once the temporary guard band has been effected, the Operator allocated spectrum on one side of the (temporary) guard band may be able to re-use spectrum allocated to another Operator on the other side of the (temporary) guard band. Hereinafter, this spectral re-use is termed 'Network Sharing'.

Network sharing, from a common infrastructure perspective, provides advantages in the area of infrastructure costs, as well as cell site acquisition, installation, maintenance and network management.

Network sharing requires the communication system to support a user device employing both FDD and TDD technology, in parallel and concurrently. Furthermore, a UE needs to be able to be connected to its home FDD network, whilst also being able to receive broadcast services from a separate TDD network that is not part of the home network. In addition, and simultaneously, the UE needs to be able to support conventional data and speech services over its home network. The broadcast services provided to the user on the TDD network need to appear as though they originate from the home network, including all billing and security aspects.

In accordance with this enhanced embodiment of the invention, two forms of network sharing may be employed:

Full Network Sharing:

Full network sharing encompasses a scenario when all FDD UEs in an uplink band of 1920 MHz to 1980 MHz are able to receive broadcast services in the unpaired spectrum, without seeing noticeable de-sensitisation from FDD uplink transmissions in the same UE.

Partial Network Sharing

Partial network sharing encompasses a scenario when a subset of FDD UEs are able to receive broadcast services in the unpaired spectrum, without seeing noticeable de-sensitisation from FDD uplink transmissions in the same UE.

In accordance with embodiments of the invention, the spectrum allocation for UMTS TDD and FDD technologies in ITU Region-1 is as follows. The TDD allocation is in a lower portion of the spectral band and is allocated 20 MHz of spectrum in the range 1900 MHz to 1920 MHz. The 20 MHz of spectrum is further segmented into four blocks of 5 MHz. This spectrum is generally referred to as unpaired spectrum, where the Node-B and UE transmit on the same carrier, but at orthogonal points in time (often referred to as Time Division Duplex (TDD)).

Further, in accordance with embodiments of the invention, the FDD uplink is allocated 60 MHz in the range 1920 MHz to 1980 MHz. The 60 MHz of spectrum is further segmented into twelve blocks of 5 MHz, where a plurality of contiguous blocks is typically allocated to a mobile operator. The FDD uplink spectrum is paired with FDD downlink spectrum and the allocation of the FDD downlink spectrum is 190 MHz offset from the uplink spectrum. This spectrum is generally referred to as paired spectrum, where the Node-B transmits in the FDD downlink allocation and the UE transmits in the FDD uplink allocation.

In Europe, a mobile Operator may be allocated both unpaired and paired spectrum; for example, we may have the allocations defined previously in Table 1.

Here, Operator A has 5 MHz of unpaired spectrum and 15 MHz of paired spectrum, whereas Operator B has 5 MHz of unpaired spectrum and 10 MHz of paired spectrum. We note that Operator A has unpaired spectrum that is immediately adjacent to the uplink paired spectrum. This situation is typical in ITU Region-1 spectral allocations.

In summary, therefore, in accordance with embodiments of the invention, the following partition of spectrum is proposed:
 1900 MHz to 1910 MHz to be used by all Operators that have FDD spectrum
 1910 MHz to 1915 MHz is to be used by those Operators that have spectrum that is greater than 1925 MHz
 1915 MHz to 1920 MHz is to be used by those Operators that have spectrum that is greater than 1930 MHz.

Effectively, the TDD spectrum is partitioned into three spectral bands:
 Primary band: 1900 MHz to 1910 MHz
 Secondary Band I: 1910 MHz to 1915 MHz
 Secondary Band II: 1915 MHz to 1920 MHz Thus, the TDD Primary Band enables Full Network Sharing. Further, the TDD Secondary Bands enable Partial Network Sharing. More specifically, Secondary Band I is configured to support FDD UEs in the uplink band 1925 MHz to 1980 MHz, and Secondary Band II is configured to support FDD UEs in the uplink band 1930 MHz to 1980 MHz.

Whilst one objective of the aforementioned Network Sharing policy is to ensure that the entire TDD spectrum asset supports Full Network sharing, in some cases, technology limitations in the radio frequency (RF) or processing circuitry of the UEs may ultimately result in a Partial Network sharing solution.

A primary benefit in a provision of full Network Sharing is that no Operators are precluded from the service. Hence, it is possible to maximise the user population, which means higher revenues and an enhanced spectral eco-system, since all Operators have access to the service.

Figure 9:
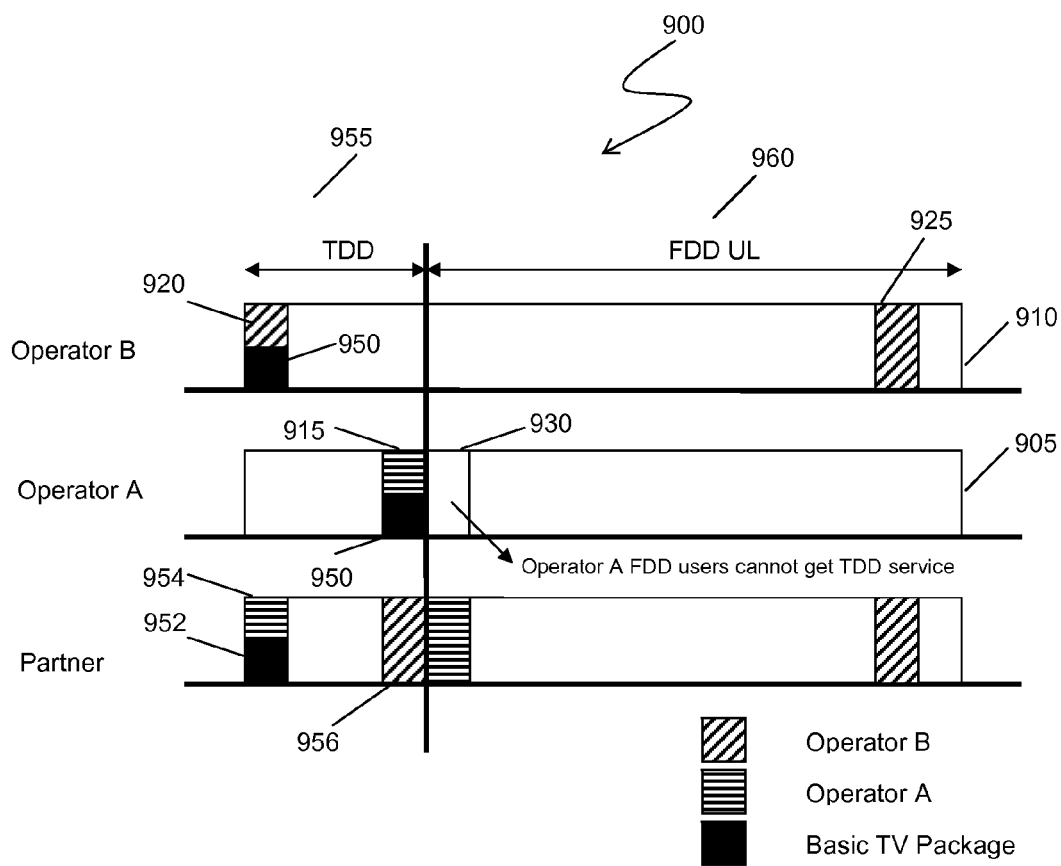
FIG. 9 illustrates a network sharing scheme in accordance with embodiments of the invention.

Let us therefore consider specific examples of how Network Sharing may be applied, in accordance with embodiments of the invention:

Referring to FIG. 9, let us consider a spectral allocation scheme 900 where both Operators are present in the same market; Operator A 905 has deployed FDD services in 1920 MHz to 1925 MHz band 915 and has not deployed any cell sites using the spectrum 1925 MHz to 1935 MHz 930; and Operator B 910 has been allocated unpaired spectrum in the primary band 1900 MHz to 1905 MHz 920 and has deployed FDD services 1960 MHz to 1965 MHz band 925.

Further, Operator B 910 has decided to deploy downlink only services (Mobile TV) in the primary band 1900 MHz to 1905 MHz 920 and allows users from other mobile Operators in the same market (such as Operator A 905) to have access to these services. From an infrastructure perspective, there are no coexistence issues surrounding Operator B, and hence full Network Sharing allows the services to be offered to all mobile Operators.

Hence, if Operator A 905 wishes to provide broadcast Mobile TV to its customers then it requests services from Operator B 910, as Operator A 905 is unable to provide Mobile TV services to its own customers due to the proximity of the FDD UL band 930 to its allocated TDD spectrum 915. However, Operator A 905 could provide Mobile TV services to other Operators since the frequency separation is sufficient to alleviate any coexistence issues. Thus, this offers a partial Network Sharing solution, with Operator A 905 using services from other Operators as it is unable to service its own FDD customer base. Such a scenario is undesirable, particularly for Operator A 905.

Thus, let us first consider a scenario, as above, when one Operator has unpaired spectrum in a primary band and a second Operator has unpaired spectrum in one of the secondary bands. To consider this scenario further let us suppose that Operator A and Operator B aim to both provide broadcast Mobile TV services. Let us consider, as an example, that each TDD carrier of each Operator supports sixteen TV channels, which are partitioned into two blocks of eight channels per block. A first block of TV channels 950 may be used to provide a basic TV package such as BBC24, CNN, SKY SPORTS NEWS, etc; with a second block of eight channels providing value content that is specific to that operator 915, 920, e.g. music, sports, and movies. Thus, both Operator A 905 and Operator B 910 provide the basic TV package 950 and hence duplicate content, which clearly is a waste of network capacity.

In accordance with embodiments of the invention, a spectral partnership arrangement between Operator A 905 and Operator B 910 may be employed, in order to support broadcast Mobile TV for both Operator A 905 and Operator B 910. In particular, in one embodiment of the invention the TDD spectrum 955 of the two operators is aggregated to produce a combined service package that is, in practice, able to provide twice the bandwidth of a single Operator. A significant incentive for Operator A 905 is that its FDD customers obtain access to broadcast Mobile TV services via Operator B's spectral allocation.

Thus, in accordance with one embodiment of the invention, the Operators aggregate their spectrum to produce thirty-two TV channels. The thirty-two TV channels are now partitioned into three blocks, one block provides the basic TV package 952, one block 954 provides the specific content for Operator A 905 and one block 956 provides the specific content for Operator B 910. If there are eight channels for the basic TV package 952 we are left with twenty-four channels for the Operator-specific content. Since FDD customers of Operator A 905 can only get access to the primary spectrum of Operator B 910, eight channels of specific content 954 are assigned to Operator A in the primary band, which leaves sixteen channels of specific content 956 for Operator B 910 in the secondary band.

Thus, the aforementioned partnership model supports a full Network Sharing solution for the basic TV package that satisfies both Operators and a Partial Network Sharing solution for the Operator-specific content. This latter point is particularly advantageous, since ultimately Operator-specific content by its very nature should be a Partial Network Sharing solution, i.e. only a subset of users has access or permission to view the content. The incentive for Operator B to partner with Operator A is a 100% increase in Operator-specific content capacity.

Figure 10:
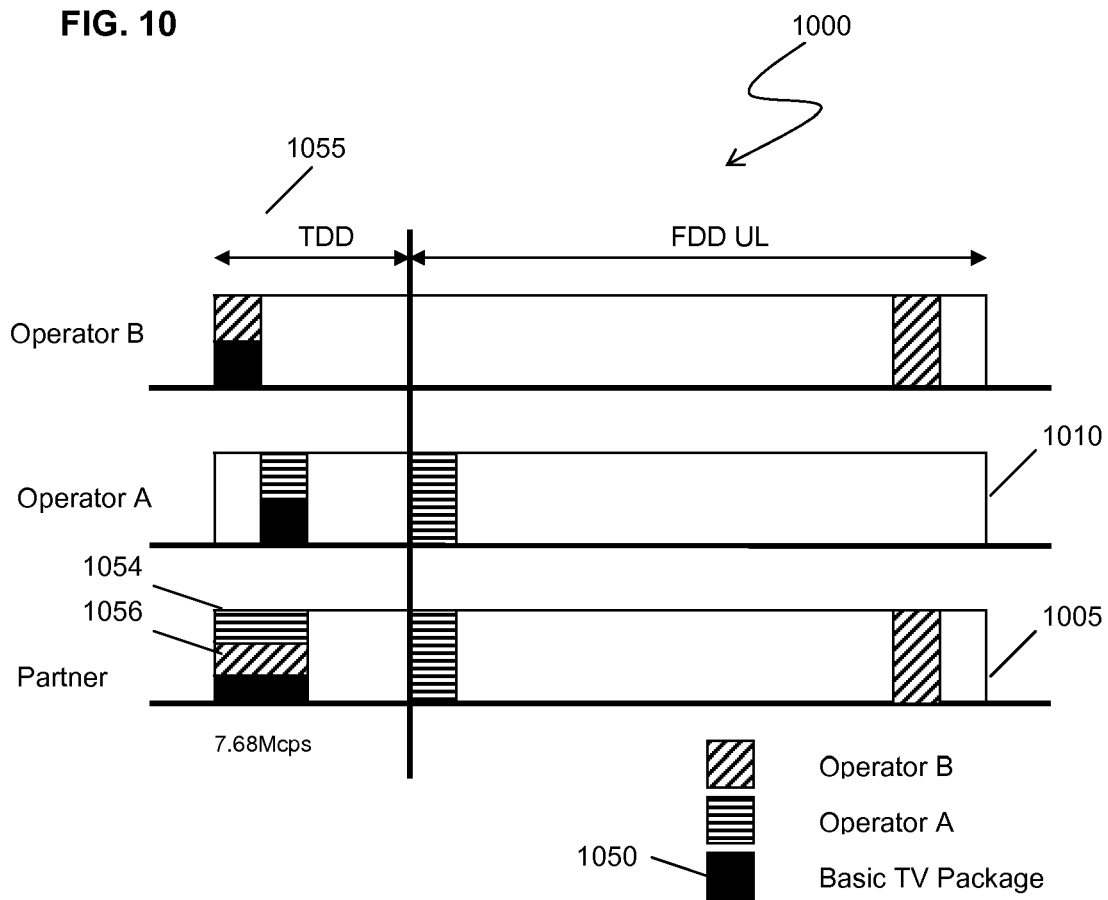
FIG. 10 illustrates a network sharing scheme in accordance with embodiments of the invention.

Next, and referring to FIG. 10, let us consider a scenario, where the two Operators 1005; 1010 decide to partner and both Operators 1005, 1010 have unpaired spectrum in the primary TDD band 1055. In a similar manner to the above scenario, let us assume that each 5 MHz TDD carrier support sixteen channels. A spectrum aggregation policy between the two Operators 1005, 1010, therefore produces thirty-two channels of content; where again the channel pool is partitioned into three blocks. If we assume eight channels for the basic TV package which is shared by both operators, we are left with twenty-four channels of specific content that can be equally shared between the two operators 1005, 1010, as there are no spectrum coexistence issues. This results in twelve channels per operator 1054, 1056 for Operator-specific content providing a net 50% increase in channel capacity.

With regard to spectrum aggregation with primary unpaired spectrum, one option is to deploy with 7.68 Mcps, rather than two carriers of 3.84 Mcps. There are both cost and performance benefits associated with deploying a single carrier namely:

A single transmitter is needed at the cell site rather than two. This will reduce the cost of the cell site, whilst simplifying the maintenance and deployment.

A single carrier rather than two separate carriers simplifies the management operation by the network operations centre.

By increasing the chip rate from 3.84 Mcps to 7.68 Mcps the gain in Eb/No can be up to 2 dB.

Thus, as shown in FIG. 10, all TV channels are modulated on to a single RF carrier and the UE receiving the broadcast mobile TV signal is 7.68 Mcps TDD capable. Unlike UTRA FDD, the higher chip rate version of UTRA TDD is part of 3GPP Release 7.

Thus, in accordance with embodiments of the invention, network sharing of allocated spectrum is used to maximise respective Operator's TDD spectrum assets. Advantageously, Operators that have immediately adjacent TDD spectrum with the FDD UL allocation are provided with an opportunity to support their customer base and utilise the spectral resource of another Operator.

While the invention has been described in terms of particular embodiments and illustrative figures, those of ordinary skill in the art will recognize that the invention is not limited to the embodiments or figures described.

Although embodiments of the present invention are described, in some instances, using UMTS terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term 'logic' herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 11:
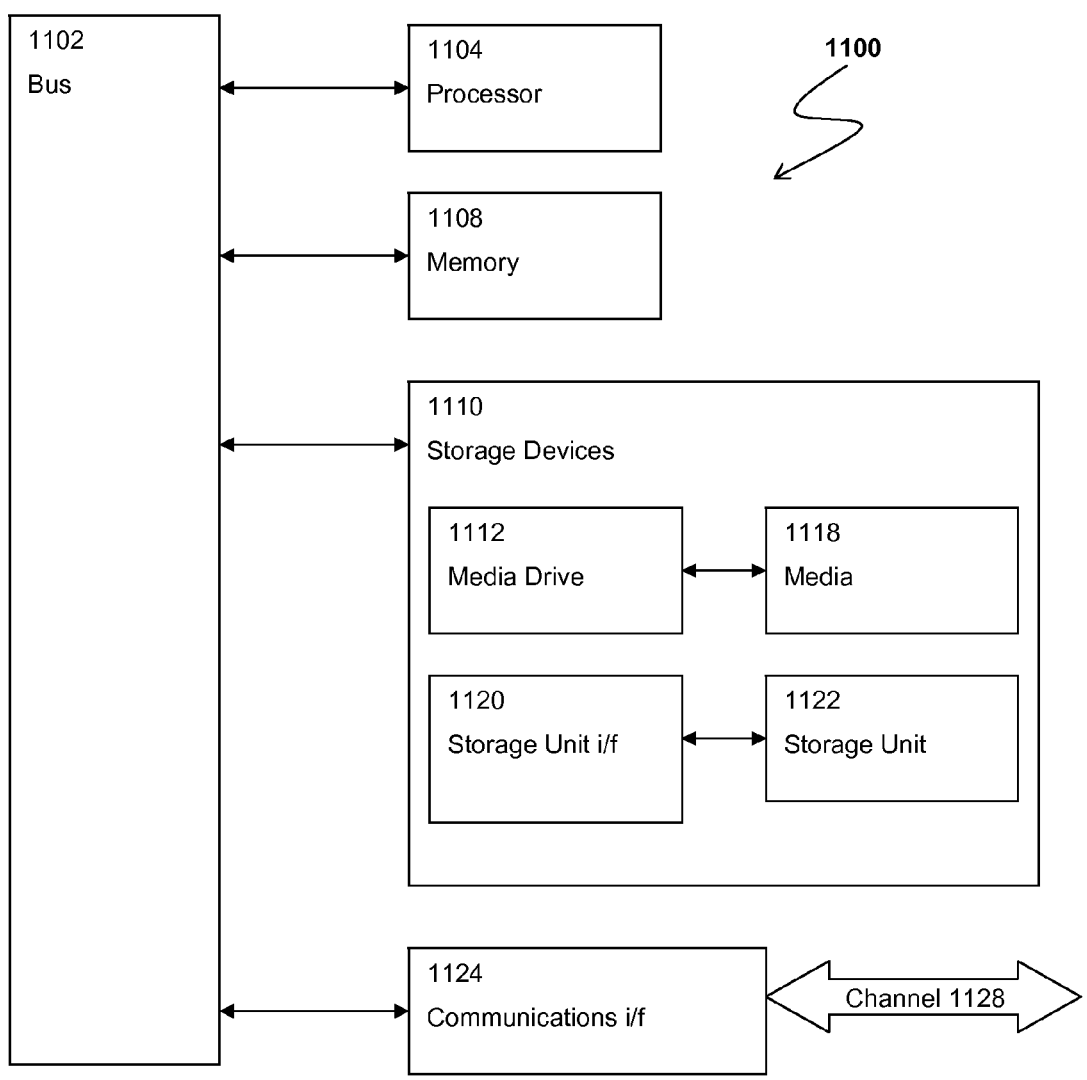
FIG. 11 illustrates a typical computing system that may be employed to implement processing functionality in embodiments of the invention.

FIG. 11 illustrates a typical computing system 1100 that may be employed to implement processing functionality in embodiments of the invention. Computing systems of this type may be used in the eNB (in particular, the scheduler of the eNB), core network elements, such as the aGW, and the UEs, for example. Those skilled in the relevant art will also recognize how to implement the invention using other computer systems or architectures. Computing system 1100 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1100 can include one or more processors, such as a processor 1104. Processor 1104 can be implemented using a general or special purpose processing engine such as, for example, a microprocessor, microcontroller or other control logic. In this example, processor 1104 is connected to a bus 1102 or other communications medium.

Computing system 1100 can also include a main memory 1108, such as random access memory (RAM) or other dynamic memory, for storing information and instructions to be executed by processor 1104. Main memory 1108 also may be used for storing temporary variables or other intermediate information during execution of instructions to be executed by processor 1104. Computing system 1100 may likewise include a read only memory (ROM) or other static storage device coupled to bus 1102 for storing static information and instructions for processor 1104.

The computing system 1100 may also include information storage system 1110, which may include, for example, a media drive 1112 and a removable storage interface 1120. The media drive 1112 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1118 may include, for example, a hard disk, floppy disk, magnetic tape, optical disk, CD or DVD, or other fixed or removable medium that is read by and written to by media drive 1114. As these examples illustrate, the storage media 1118 may include a computer-readable storage medium having stored therein particular computer software or data.

In alternative embodiments, information storage system 1110 may include other similar components for allowing computer programs or other instructions or data to be loaded into computing system 1100. Such components may include, for example, a removable storage unit 1122 and an interface 1120, such as a program cartridge and cartridge interface, a removable memory (for example, a flash memory or other removable memory module) and memory slot, and other removable storage units 1122 and interfaces 1120 that allow software and data to be transferred from the removable storage unit 1118 to computing system 1100.

Computing system 1100 can also include a communications interface 1124. Communications interface 1124 can be used to allow software and data to be transferred between computing system 1100 and external devices. Examples of communications interface 1124 can include a modem, a network interface (such as an Ethernet or other NIC card), a communications port (such as for example, a universal serial bus (USB) port), a PCMCIA slot and card, etc. Software and data transferred via communications interface 1124 are in the form of signals which can be electronic, electromagnetic, optical or other signals capable of being received by communications interface 1124. These signals are provided to communications interface 1124 via a channel 1128. This channel 1128 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1108, storage device 1118, or storage unit 1122. These and other forms of computer-readable media may store one or more instructions for use by processor 1104, to cause the processor to perform specified operations. Such instructions, generally referred to as 'computer program code' (which may be grouped in the form of computer programs or other groupings), when executed, enable the computing system 1100 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1100 using, for example, removable storage drive 1114, drive 1112 or communications interface 1124. The control logic (in this example, software instructions or computer program code), when executed by the processor 1104, causes the processor 1104 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous.

Also, the inclusion of a feature in one category of claims does not imply a limitation to this category, but rather the feature may be equally applicable to other claim categories, as appropriate.

We claim:

1. A method for enabling spectrum access in a wireless communication system that supports simultaneously at least a first mode of operation and a second mode of operation, wherein the method comprises:
   determining a proportion of spectrum required for the wireless communication unit to operate simultaneously in both the first mode of operation and the second mode of operation; and
   enabling spectrum access in a wireless communication system by allocating a temporary guard band between a first portion of spectrum for the wireless communication unit to operate in the first mode of operation and a second portion of spectrum for the wireless communication unit to operate simultaneously in the second mode of operation, wherein a bandwidth of the temporary guard band is based on a mapping of services to one or more frequency carriers.

2. The method of claim 1 wherein the first mode of operation comprises operation in unpaired spectrum and the second mode of operation comprises operation in paired spectrum.

3. The method of claim 1 wherein the first mode of operation comprises downlink only transmissions and the second mode of operation comprises frequency division duplex (FDD) uplink operation.

4. The method of claim 1 wherein the first mode of operation comprises broadcast TV downlink transmissions.

5. The method of claim 1 wherein allocating a bandwidth of the temporary guard band comprises allocating a bandwidth of the temporary guard band that is an integer multiple of an unpaired channel bandwidth.

6. The method of claim 1 wherein allocating a bandwidth of the temporary guard band comprises allocating a bandwidth that falls at least partially within a first spectrum band supporting the first mode of operation.

7. The method of claim 1 wherein allocating a bandwidth of the temporary guard band comprises allocating a bandwidth as an integer multiple of the first portion of spectrum.

8. The method of claim 1 further comprising transmitting a message to the wireless communication unit to instruct the wireless communication unit to limit transmissions within the temporary guard band.

9. The method of claim 1 wherein enabling spectrum access in a wireless communication system further comprises re-allocating at least a portion of the temporary guard band for use by at least one further wireless communication unit.

10. The method of claim 1 further comprising receiving a first signal from the wireless communication unit wherein the first signal comprises a request for the wireless communication unit to operate simultaneously in both the first mode of operation and the second mode of operation.

11. The method of claim 10 wherein receiving the first signal comprises receiving an implicit request from the wireless communication unit to operate simultaneously in both the first mode of operation and the second mode of operation.

12. The method of claim 10 wherein receiving the first signal comprises receiving a request for a service from the wireless communication unit.

13. The method of claim 12, wherein the requested service comprises a broadcast service.

14. The method of claim 10 wherein receiving the first signal comprises identifying an explicit request from the wireless communication unit to operate simultaneously in both the first mode of operation and the second mode of operation.

15. The method of claim 1 further comprising sending to the wireless communication unit a request for an indication from the wireless communication unit of a desired temporary guard band.

16. The method of claim 15 further comprising receiving an indication from the wireless communication unit of a desired temporary guard band.

17. The method of claim 1 further comprising transmitting at least an encryption parameter the wireless communication unit to instruct the wireless communication unit to operate in a first portion of spectrum in the first mode of operation and simultaneously in a second portion of spectrum in the second mode of operation.

18. The method of claim 1 further comprising enabling access to a first Operator and a second Operator are allocated shared spectrum on one or both sides of the temporary guard band.

19. The method of claim 18 wherein the first Operator utilises spectrum allocated to the second Operator.

20. The method of claim 18 further comprising aggregating a spectrum allocation of the first Operator and second Operator and sharing at least a portion of the aggregated spectrum therebetween.

21. The method of claim 20 further comprising providing shared content in the shared at least a portion of the aggregated spectrum.

22. The method of claim 21 wherein the shared content comprises shared TV channels.

23. The method of claim 20 wherein the shared aggregated spectrum comprises unpaired spectrum adjacent to the frequency division duplex (FDD) uplink (UL) allocation.

24. A wireless communication unit capable of a simultaneous dual mode operation for simultaneously communicating in at least a first mode of operation and a second mode of operation, wherein the wireless communication unit comprises:
   a transceiver capable of transmitting and receiving simultaneously in both a first mode of operation in a first portion of spectrum and a second portion of spectrum in a second mode of operation; and
   logic for adapting a frequency of operation of the transceiver to accommodate an allocated temporary guard band between the first portion of spectrum and second portion of spectrum for a duration of a simultaneous dual mode operation of the wireless communication unit.

25. The wireless communication unit of claim 24 further comprising logic for determining a desired temporary guard band operably coupled to the transceiver capable of transmitting an indication of the desired temporary guard band from the wireless communication unit to spectral allocation logic in a wireless communication system supporting the first mode of operation and second mode of operation.

26. The wireless communication unit of claim 25 wherein the wireless communication unit is a subscriber wireless communication unit.

27. The wireless communication unit of claim 24 wherein the wireless communication unit is a base station.

28. A method of simultaneously communicating in at least a first mode of operation and a second mode of operation of a wireless communication system, wherein the method comprises:
   transmitting and receiving simultaneously in both a first mode of operation in a first portion of spectrum and in a second mode of operation in a second portion of spectrum; and
   adapting a frequency of operation of transmitting and receiving simultaneously in a first portion of spectrum and second portion of spectrum to accommodate an allocated temporary guard band between the first portion of spectrum and second portion of spectrum, wherein the temporary guard band is dynamically allocated in response to a request for simultaneous dual-mode operation and for a duration of the simultaneous dual-mode operation.

29. The method of claim 11 wherein the allocating is performed in response to the request.

30. The method of claim 29 wherein allocating a bandwidth of the temporary guard band comprises allocating a bandwidth that falls at least partially within a second spectrum band operating in the second mode of operation.

* * * * *